United States Patent Office 2,855,371
Patented Oct. 7, 1958

2,855,371

ION EXCHANGE RESINS OF REDUCED WATER CONTENT

Irving M. Abrams, San Carlos, Calif., assignor to Chemical Process Company, San Francisco, Calif., a corporation of Nevada No Drawing. Application June 25, 1954
Serial No. 439,461

6 Claims. (Cl. 260—2.1)

This invention relates to lowering the water content of ion exchange resins without affecting the ability of such resins to become wet and sink upon subsequent immersion in water or aqueous solutions, and in particular to the incorporation of a surface active agent in the resin for such purpose.

Ion exchange resins in the course of manufacture contain considerable amounts of water which may be absorbed, adsorbed or even chemically combined. Generally, sufficient moisture is removed from the resin after manufacture and before shipment so that the resins contain from 40% to 60% by weight moisture of the total amount of moisture and resin when they are shipped to the consumer. It would be desirable to remove at least a portion of this moisture from the shipped resin since this appreciable amount of moisture increases shipping and handling costs. However, if the moisture content of the ion exchange resin is reduced appreciably below approximately 40% by weight, a substantial proportion of the resin beads tends to float when the user places the resin in water. This floating of the resin is undesirable because the floating resin is separated from the resin bed and lost when the bed is subjected to a backflow to remove small particles, called fines, and the ion exchange operations are rendered less efficient.

It is believed that adsorbed air and the resulting high interfacial tension between dry ion exchange resins and water causes the floating of the resin when the moisture content is reduced appreciably below 40% by weight of the water containing resin product. Consequently, it has not been the general practice to dehydrate most ion exchange resins before shipment because of the problems caused by floating of the dehydrated resin. Furthermore, some ion exchange resins are not dehydrated before shipment to the consumer because of the possibility of breakage upon rewetting.

Summarizing this invention, partially dehydrated ion exchange resins that are readily wet and sink upon immersion in water or aqueous solutions may be prepared by subjecting the resin to a solution of a surface actice agent, and then partially dehydrating the ion exchange resin. Best results are obtained when the surface active agent is of a type that is not strongly absorbed by the ion exchange resin.

The resultant partially dehydrated ion exchange resin impregnated with a surface active agent so as to have such agent deposited thereon, is lighter and less expensive to ship than the moist resin containing the usual moisture content heretofore employed; and substantially all of the resin sinks rapidly upon immersion in water. This is due to the advantageous placement of surface active agent on the surface and in the pores of the ion exchange resin by the solution of the surface active agent, and the resultant deposit of the surface active agent at such locations upon evaporation of the solution. In this manner, the maximum effective concentration of surface active agent is provided on the ion exchange resin surface that is to be wet.

Furthermore, the ion exchange properties of the resin, such as exchange capacity and ability to be regenerated after use, remain unaffected by the surface active agent. By the use of these surface active agents, the ion exchange resins can be shipped with moisture contents appreciably below 40% by weight of the water containing resin, and still be readily wetted and sink in water.

In greater detail, any of the well known ion exchange resins may be treated with a surface active agent so that the subsequently partially dehydrated resin with readily sink when it is placed in water. This invention is applicable to both anion and cation exchange resin, weak and strong, having functional ion exchange groups attached to any of the base resins commonly employed for such purpose.

Ion exchange resins having functional exchange groups attached to base resins comprising cross linked resinous copolymers of monovinyl aromatic monomers and polyvinyl compounds are commonly used ion exchange resins at the present time, and this invention is particularly useful in enabling such ion exchange resins to sink readily after considerable dehydration. The preparation of base resins of cross-linked resinous copolymers of monovinyl aromatic compounds and polyvinyl compounds is described in United States Letters Patent Nos. 2,366,007; 2,366,008; 2,591,573; 2,614,099; 2,629,710 and others.

This widely used base resin is prepared by copolymerizing in the presence of a polymerization catalyst one or more monovinyl aromatic compounds such as styrene, vinyl toluene, vinyl xylene, vinyl napthalene, ethyl vinyl benzene, and vinyl chlorobenzene with one or more divinyl aromatic compounds such as divinyl benzene, divinyl toluene, divinyl xylene, divinyl napthalene and divinyl acetylene. A suitable range of proportions of the monovinyl monomer is from 60.0% to 99.9% on a molar basis, with the corresponding range of the polyvinyl compound being from 40.0% to 0.1%. Thus, the resultant copolymerized base resin is formed from a major proportion of the monovinyl compound and a minor proportion of the polyvinyl compound.

Cation exchange resins comprising sulfonated cross-linked copolymers of such monovinyl and polyvinyl compounds are very slow to rewet and sink following dehydration unless they are first subjected to a surface active agent in accordance with this invention. Such sulfonic acid cation exchange resins are described in United States Letters Patent No. 2,366,007. The sulfonated polystyrene cation exchange resin of this type having a base resin prepared from the copolymerization of styrene and divinyl benzene is a very commonly used ion exchange resin at the present time because of its utility as a water softener. In view of this usage, and the fact that this cation exchange resin is generally employed by inexperienced operators who may lose any resin that is floating during the initial backwashing for removal of fines, this invention is of particular value and usefulness when employed in the dehydration of such sulfonated polystyrene resins.

Examples of anion exchange resins to which this invention is applicable and in which the base resin is of cross-linked copolymer of a monovinyl and polyvinyl compound are described in United States Letters Patent Nos. 2,366,008, 2,591,573 and 2,614,099. Patents Nos. 2,591,573 and 2,614,099 described a strong quaternary ammonium type anion exchanger that readily wets and sinks if it has been subjected to a surface active agent before dehydration.

Examples of other types of ion exchange resins to which this invention is applicable are the carboxylic cation exchange resins prepared from methacrylic acid and a poly-unsaturated compound as described in United States Letters Patent Nos. 2,340,110 and 2,340,111. Other examples are the phenol-formaldehyde type anion exchange resins as described in United States Letters Patent Nos. 2,341,907, 2,356,151, 2,402,384 and 2,521,288; the phenol formaldehyde sulfonic acid type cation exchangers as described in United States Letters Patent Nos. 2,191,853, 2,228,159 and 2,448,029; and the urea, biguanide, aldehyde condensate anion exchange resins as described in United States Letters Patent No. 2,251,234; the polyamine, aldehyde, ketone condensate anion exchange resins as described in United States Letters Patent No. 2,442,989; and the polyamine-epihalohydrin condensate anion exchange resins as described in United States Letters Patent Nos. 2,469,683 and 2,610,156.

Any of the well known surface active agents, frequently called wetting agents, may be employed for impregnating ion exchange resins before dehydration of such resins in accordance with this invention. Suitable surface active agents for use in the practice of this invention may readily be selected from available literature such as "Encyclopedia of Surface-Active Agents," by I. P. Sisley and P. J. Wood, Chemical Publishing Co., Inc., New York, 1952. Such surface active agents are organic compounds which, when present in solution in sufficient concentration, have the property of effecting a change in the surface tension of the solution. Generally, surface active agents are characterized by the presence of an organophilic group associated with a hydrophilic group.

As is well known in the art, surface active agents may usually be classified as anionic, cationic or non-ionic depending upon their ionic characteristics. When any of the well known strong ion exchange resins with high exchange capacity are impregnated with a surface active agent of the type that is strongly adsorbed by such ion exchange resins, the ion exchange resins adsorb the surface active agent and thereby lessen its effectiveness in rendering the resin readily wet and sinkable. Consequently, best results are obtained by employing a wetting agent whose ionic characteristics are such that it is not strongly adsorbed and whose wetting properties are substantially unaffected by the ion exchange resin, since it is undesirable for best results and for economical reasons to use a large excess of surface active agent that may be required to provide wetting of the ion exchange resin when the surface active agent is adsorbed by such highly active ion exchange resins.

For example, a strong cation exchange resin, such as the well known sulfonated polystyrene resin, is preferably impregnated with an anionic or a non-ionic type surface active agent, or in other words, with a non-cationic type of surface active agent. Likewise, strong anion exchange resins, such as the quaternary ammonium type previously described, should preferably be impregnated with a non-anionic surface active agent. However, any type of surface active agent in its salt form may generally be employed with the well known weak ion exchange resins, such as carboxylic acid cation exchange resins, for the purposes of this invention.

General examples of types of anionic surface active agents that may be employed are the sodium salts of sulfonated alkyl or aryl hydrocarbons, sulfonated fatty-acid esters, soaps, products obtained from the sulfonation of alcohols, and sulfonated fatty amides. Specific examples of anionic surface active agents that have proven to be very effective for impregnating cation exchange resins before dehydration to enable the dehydrated resin to sink rapidly when placed in water, are dioctyl sodium sulfosuccinate sold under the name of Aerosol OT by Americal Cyanamid Co., a solution of sodium tetradecyl sulfonate sold as Tergitol 4 by Carbide and Carbon Chemicals Co., sodium alkyl aryl sulfonates sold under the name Oronite D-40 by Oronite Chemical Co. and the sodium salts of sulfonated petroleum hydrocarbons sold as Ultrawet DS and Ultrawet 60L by the Atlantic Refining Co.

Suitable non-ionic surface active agents that do not contain groups strongly adsorbed by cation or anion exchange resins include products obtained by auto-condensation of fatty matters and their derivatives with ethylene oxide, and products obtained by condensation of phenolic compounds having lateral chains with ethylene oxide type groups. A specific example of a suitable non-ionic surface active agent is alkyl phenyl polyoxyethelene ether which is sold under the name Oronite NI-8586 or Oronite Dispersant NI-W by Oronite Chemical Co.

Examples of some cationic surface active agents that are most useful for impregnating anion exchange resins in accordance with this invention are high molecular weight aliphatic amines and their derivatives, homologs of aromatic amines having fatty chains, fatty amides derived from aliphatic diamines, fatty amines derived from disubstituted diamines, and quaternary ammonium salts and hydrates. Specific examples of cationic surface active agents that may be employed are a mixture of high molecular weight alkyl dimethyl benzyl ammonium chlorides sold under the name Roccal by Winthrop Stearns, Inc., and acyl colamino formyl methyl pyridinium chloride sold under the name of Emulsept by Emulsol Company of Chicago, Illinois.

The ion exchange resin may be impregnated with the surface active agent in any convenient manner, such as by soaking the resin, either dry or in a moist state, in a solution of the surface active agent, or by subjecting the ion exchange resin to a light spray of a solution of the surface active agent, or by passing the resin on a conveyor through a container of the surface active solution. The length of time of contact between the ion exchange resin and the surface active agent is not important, since the ion exchange resins are by their nature fairly porous and readily take up a sufficient amount of the solution of surface active agent.

It is most convenient and economical to impregnate the ion exchange resin with a solution of the surface active agent in water, and reference herein is made to partial dehydration of the resin after it is impregnated with the aqueous solution of the surface active agent. However, any liquid solvent for the surface active agent may be employed which will not attack the ion exchange resin, and which may be evaporated, leaving the surface active agent on the resin surface and in the pores. Examples of such solvents are alcohols such as methyl alcohol, ethyl alcohol, and isopropyl alcohol, and ketones such as acetone and methyl ethyl ketone.

The concentration of surface active agent in the solution may vary from as low as 0.001% by weight to as high as 10% by weight, and may even go beyond this range. However, it is unlikely that any surface active agent is so efficient that it would be effective when employed for the purposes of this invention in a solution of less than 0.001% by weight concentration. Also, if more than a 10% solution is employed, a problem in foaming of the solution is frequently encountered. Furthermore, the use of such a concentrated solution is unnecessary and uneconomical. The most useful range of concentration of the solution employed for impregnating ion exchange resins before dehydration of the resin is between 0.05% and 2.0% by weight of surface active agent.

After the ion exchange resin has been subjected to the solution of the surface active agent, the excess solution is drained from the resin and the resin is dehydrated in order to leave the surface active agent on the surface and in the pores of the ion exchange resin. The dehydration may be carried out in any convenient manner such as by use of a vacuum or preferably by heating the moist resin. The temperature at which the dehydration is carried out is not critical as long as it is not so high that the ion exchange resin is scorched. A temperature in the vicinity of 100° C. has proven satisfactory for drying ion exchange resins.

The extent to which an ion exchange resin may be dehydrated without adverse effects depends upon the type of ion exchange resin being dehydrated. With all ion exchange resins except the very highly ionized sulfonic acid type cation exchange resins having high capacity, such as the sulfonated polystyrene cation exchange resin, the dehydration may be carried out to any low moisture content desired or even until the resin is completely dehydrated.

However, the sulfonated polystyrene type cation exchange resin swells and shatters due to osmotic forces if it has a moisture content below about 15% by weight when it is subjected to water. This shattering is highly undesirable since it produces fines which are readily lost from the resin bed and cause inefficient ion exchange operations. Consequently, in dehydrating the previously described ion exchange resins having sulfonic acid functional groups attached to a base resin copolymer of a monovinyl aromatic compound and a polyvinyl compound, as exemplified by the sulfonated polystyrene cation exchange resin, it is generally inadvisable to continue dehydration to a moisture content much below about 15% to 20% by weight of the moist resin, in order to prevent subsequent shattering of such ion exchange resins.

The moisture content of the ion exchange resins may be determined by any of the well known methods for determining moisture. For example, resin samples may be weighed before and after drying to constant weight in a circulating air oven, or the well known Karl Fischer method of determining moisture content may be used.

After partial dehydration of the ion exchange resins in accordance with this invention, they are much lighter and may be shipped to the user at less expense. Also, ion exchange resins dried to below 40% by weight moisture content are dry in appearance, and are easily handled since they are free flowing in contrast to the moist undehydrated resin which does not flow freely. When the user places such partially dehydrated resins in water, substantially all of the resin readily wets and sinks.

Although this invention is primarily of importance with respect to ion exchange resins that have less than 40% by weight moisture content, ion exchange resins having a greater amount of moisture when shipped than 40% may also be advantageously subjected to a solution of a surface active agent before being sent to the user. This eliminates any problem caused by drying of the ion exchange resin during shipment or storage under conditions of low humidity. Also, easier and more certain wetting is provided for comparatively moist ion exchange resins even though no appreciable problem is generally encountered with ion exchange resins having a moisture content appreciably above 40% by weight.

The following are typical examples of the partial dehydration of ion exchange moisture containing resins after first subjecting such resins to a solution of a surface active agent in accordance with this invention. In all of the following examples, the moisture contents were determined by weighing resin samples before and after heating in a circulating air oven at about 110° C. until no further change occurred. All moisture contents are expressed on the basis of the total weight of water in the water containing resin. All of the ion exchange resins employed in the examples initially contain the customary 40% to 60% by weight moisture. This moisture content is obtained in the commercial resin by drainage and vacuum removal of the excess water present in the ion exchange resin as a result of the process of manufacturing the resin.

*Example 1*

A cation exchange resin comprising a sulfonated copolymer of styrene and divinyl benzene manufactured in accordance with United States Patent No. 2,366,007 was partially dehydrated in accordance with this invention. This resin is sold commercially under the name Chempro C-20 by Chemical Process Company. The net weight of the water containing resin, as heretofore customarily shipped is about 50 lbs. per cu. ft.; and it contains a moisture content of approximately 50% by weight.

100 lbs. of this sulfonated polystyrene resin having a moisture content of 51% was immersed in 20 gallons of a 0.5% by weight aqueous solution of an anionic surface active agent comprising 66% sodium alkyl aryl sulfonates derived from petroleum base hydrocarbons and sold under the name Oronite WA by Oronite Chemical Co. The mixture was agitated mechanically for one-half hour. The cation exchange resin was removed from the solution of surface active agent and dried continuously in a conventional cylindrical rotary type drier heated by means of steam coils. The speed and temperature of the drier were adjusted so that the final moisture content was between 20% and 25%. After completion of the drying, a sample of the cation exchange resin was analyzed for moisture content, and it was found to contain 21.8% by weight water.

The resultant partially dehydrated cation exchange resin was dry in appearance and free flowing, and is shippable with this moisture content to provide the advantages pointed out previously. When it was poured gently on the surface of tap water, 100% of the resin particles sank within thirty seconds. No breakage of the resin occurred.

As a control test, a small amount of the same sulfonated polystyrene cation exchange resin was dried in the rotary drier without first subjecting the resin to the solution of surface active agent, until a moisture content of 26.3% by weight was obtained. The dried resin was dry in appearance and free flowing after the partial dehydration. However, when it was poured into tap water, the bulk of the cation exchange resin wetted slowly and sank over a five minute period. Even after two hours, about 2% of the control sample of the resin remained floating, thereby illustrating the importance of impregnation with surface active agents in enabling partially dehydrated sulfonated polystyrene cation exchange resins to sink readily.

*Example 2*

The resin employed in this example was an anion exchange resin having quaternary ammonium groups attached through methylene bridges to a cross-linked copolymer of styrene and divinyl benzene. This resin is manufactured in accordance with United States Patents Nos. 2,591,573 and 2,614,099, and is sold under the name Duolite A-40 by Chemical Process Company.

100 grams of the moist resin was immersed in a 4% aqueous solution of a non-ionic surface active agent comprising an alkyl phenyl polyoxyethylene ether which is sold under the name of Oronite NI-8586 by Oronite Chemical Co. The anion exchange resin was allowed to stand in the solution of the non-ionic surface active agent for a period of about five minutes.

The quaternary ammonium anion exchange resin was then removed from the solution, the excess solution was drained off, and the moist resin was dried in a laboratory oven at a temperature of 70° C. for three hours.

The resultant partially dehydrated resin was dry in appearance and free flowing, and had a moisture content of 12.5% by weight in which condition it could be shipped. When this partially dehydrated anion exchange resin was dropped into a container of tap water, the bulk of the resin sank immediately with only a few particles remaining on the surface, which particles sank upon mild agitation of the water.

As a control test, a small sample of the same anion quaternary ammonium exchange resin not treated with a surface active agent was dried until it had a moisture content of about 12%. This untreated resin was placed in water, and the large bulk of the resin floated for several hours even following agitation of the surface of the water.

Example 3

A weakly basic cation exchange resin comprising carboxylic acid groups attached to a base resin prepared from methacrylic acid and an unsaturated compound was employed in this example. The resin was prepared in accordance with United States Patent No. 2,340,111, and it is sold commercially under the name Duolite CS–101 by Chemical Process Company.

50 grams of this resin containing about 55% by weight water was immersed in 200 ml. of a 0.2% aqueous solution sodium dioctyl sulfosuccinate, an anionic surface active agent, sold under the name of Aerosol OT by American Cyanamid Company. The resultant slurry was agitated for three hours.

The liquid was then drained from the resin and the resin was dried at 80° C. for two hours in a warm air oven. The dried resin had a shippable moisture content of about 21%.

When the dried resin was placed in water, about 90% of the resin sank immediately after spreading on the water surface. The remainder of the resin sank easily with mild agitation.

As a control, 50 grams of the same cation exchange resin was dried in a warm air oven at a temperature of about 80° C. to a moisture content of about 22%. Only about 20% of the untreated resin sank when spread on the water surface, and a considerable amount of the resin remained floating even after agitation.

Example 4

A weakly basic anion exchange resin in which polyalkylene polyamine groups are linked through methylene bridges to a cross linked copolymer of styrene and divinyl benzene was employed in this example. This resin is made in accordance with United States Patent No. 2,591,574 and sold under the name of Duolite A–14 by Chemical Process Company.

50 grams of the moist hydroxyl form of this resin was immersed in 250 ml. of a solution containing 1% of Roccal, which is a cationic surface active agent sold by Winthrop Stearns, Inc. and which contains a mixture of high molecular weight alkyl dimethyl benzyl ammonium chlorides. The slurry was agitated for two hours, and the solution of surface active agent was then drained off.

The moist treated resin was then dried in a warm air oven at 40° C. for sixteen hours. The resultant resin had a water content of about 28% and was free flowing in appearance. Upon placing this impregnated resin in water, it became wet and sank in a short period of time.

As a control experiment, 50 grams of the moist hydroxyl form of the anion exchange resin employed in the previous part of the example, was dried for sixteen hours at 40° C. in a warm air oven along with the impregnated resin. The untreated resin had a moisture content of about 28% after being dried for this period. When this resin was placed in water, it became wet very slowly and sink only after considerable agitation.

I claim:

1. Substantially insoluble ion exchange resin beads having functional ion exchange groups attached to an insoluble, infusible cross-linked synthetic resinous matrix copolymer of a monovinyl aromatic hydrocarbon and a polyvinyl aromatic hydrocarbon, said beads being dehydrated to a moisture content of less than about 28% rendering said beads substantially free flowing, and having a water soluble wetting agent deposited thereon of an ionic character that is unexchanged by said ion exchange resin and which has the property of lowering the surface tension when said ion exchange resin beads are placed in water to cause substantially all of said resin beads to sink rapidly.

2. The ion exchange resin of claim 1 in which said functional ion exchange groups are anion exchange groups and said wetting agent is non-anionic.

3. The ion exchange resin of claim 1 in which said functional ion exchange groups are cation exchange groups and said wetting agent is non-cationic.

4. The method of preparing substantially insoluble dehydrated cross-linked copolymer of styrene with a polyvinyl aromatic hydrocarbon ion exchange resin beads having strong functional groups attached thereto selected from the group consisting of sulfonic acid cation exchange groups and quaternary ammonium anion exchange groups whereby said beads are readily wet and sink upon subsequent immersion in aqueous media, which comprises subjecting such ion exchange resin beads after they have been prepared to an aqueous solution of a water soluble wetting agent of an ionic character that is substantially unadsorbed by said functional ion exchange groups and which has the property of lowering the surface tension when said ion exchange resin beads are placed in water to cause substantially all of said resin beads to sink rapidly, and dehydrating said ion exchange resin beads to a moisture content of less than about 40% to render the resin beads substantially free flowing.

5. The method of preparing substantially insoluble dehydrated cross-linked copolymer of styrene with a polyvinyl aromatic hydrocarbon cation exchange resin beads having sulfonic acid cation exchange groups whereby said beads are readily wet and sink upon subsequent immersion in aqueous media, which comprises subjecting such ion exchange resin beads after they have been prepared to an aqueous solution of a water soluble non-cationic wetting agent which has the property of lowering the surface tension when said ion exchange resin beads are placed in water to cause substantially all of said resin beads to sink rapidly, and dehydrating said ion exchange resin beads to a moisture content of about 40% to 15%, to render the resin beads substantially free flowing.

6. The method of preparing substantially insoluble dehydrated cross-linked copolymer of styrene with a polyvinyl aromatic hydrocarbon anion exchange resin beads having quaternary ammonium functional anion exchange groups in order to cause said beads to be readily wet and sink upon subsequent immersion in aqueous media, which comprises subjecting such ion exchange resin beads after they have been prepared to an aqueous solution of a water soluble non-anionic wetting agent which has the property of lowering the surface tension when said ion exchange resin beads are placed in water to cause substantially all of said resin beads to sink rapidly, and dehydrating said ion exchange resin beads to a moisture content of less than about 40% to render the resin beads substantially free flowing.

References Cited in the file of this patent

UNITED STATES PATENTS

| | | |
|---|---|---|
| 2,581,035 | Martin et al. | Jan. 1, 1952 |
| 2,610,156 | Lundberg | Sept. 9, 1952 |
| 2,610,170 | Lundberg | Sept. 9, 1952 |
| 2,645,627 | Gustus | July 14, 1953 |

OTHER REFERENCES

Glasstone: Physical Chemistry, pp. 488, 1182, Van Nostrand, 1940.

UNITED STATES PATENT OFFICE
CERTIFICATE OF CORRECTION

Patent No. 2,855,371 October 7, 1958

Irving M. Abrams

It is hereby certified that error appears in the printed specification of the above numbered patent requiring correction and that the said Letters Patent should read as corrected below.

Column 2, line 10, for "with" read -- will --; column 2, line 65, for "described" read -- describe --.

Signed and sealed this 13th day of January 1959.

(SEAL)
Attest:

KARL H. AXLINE
Attesting Officer

ROBERT C. WATSON
Commissioner of Patents